Patented May 2, 1933

1,906,890

UNITED STATES PATENT OFFICE

MAX WEILER, OF WIESDORF-ON-THE-RHINE, KARL BERRES, OF COLOGNE-MULHEIM, BERTHOLD WENK AND HERMANN STÖLTER, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CONDENSATION PRODUCT FROM HALOGENATED PHENOLS AND ALDEHYDES

No Drawing. Application filed January 25, 1930, Serial No. 423,536, and in Germany January 30, 1929.

The present invention relates to a process of preparing condensation products from m-halogenated phenols and aldehydes and to the new compounds obtainable thereby, more particularly it relates to compounds of the probable general formula

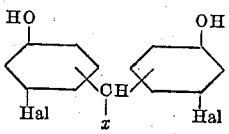

wherein Hal stands for halogen atoms, $x$ stands for hydrogen, alkyl or aryl which may be substituted, the group

stands in ortho or para position to the hydroxy groups, in case it stands in ortho position, the para position being unsubstituted and wherein the phenol nuclei may be further substituted by halogen, alkyl or alkyloxy groups.

Our new compounds are obtainable by reacting with an about molecular quantity of an aldehyde, such as formaldehyde, acetaldehyde, benzaldehyde etc. or a substitution product thereof upon a double molecular quantity of a phenol containing a halogen atom in m-position to the hydroxy group, being unsubstituted in the p-position to the hydroxy group, and which may be further substituted by halogen, alkyl or alkyloxy groups in a suitable condensing agent, such as sulfuric acid, hydrochloric acid + glacial acetic acid, zinc chloride and the like. The temperature at which the reaction takes place varies in wide limits, but may range in the most cases from about 15–100° C.; the same is to be said about the time required for finishing the condensation process which may vary from about three hours to about three days.

Our new products generally are colorless or nearly colorless powders, which are soluble in alkalies, difficultly soluble in water, except those as contain a sulfo group, and are suitable for moth-proofing materials liable to attack by moth.

The following examples illustrate our invention, without limiting it thereto:

*Example 1.*—25.7 parts by weight of m-chloro-phenol and 7.9 parts by weight of 40% formaldehyde are stirred with 167 parts by weight of 50% sulfuric acid first at 20° C. and then at 65–70° C. until the condensation is complete. The condensation product is separated and after blowing off any small quantities of chlorophenol still remaining it is dissolved in caustic soda lye, filtered again, if necessary and reprecipitated with acid. The product is readily soluble in benzene, rather sparingly soluble in hot ligroin. On cooling it is precipitated in a crystalline form. In its free state, that means when the hydroxy groups are unneutralized, it has the formula:

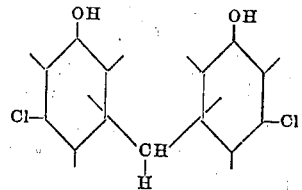

it being uncertain whether the —CH— group

is attached to the nuclei in ortho- or para-position to the hydroxy group.

6-chloro-2-cresal ($CH_3 : OH : Cl = 1 : 2 : 6$) condenses with formaldehyde in the same manner. The condensation product is readily soluble in benzene and on cooling separates out in small crystals.

*Example 2.*—53.8 parts by weight of 2.5-dichloro-phenol and 31.2 parts by weight of sodium benzaldehyde-o-sulfonate are stirred in 190 parts by weight of sulfuric acid of 66° Bé. for about 24 hours at about 50° C. until the condensation is complete. The reaction mass is poured on to ice. The condensation product which separates is filtered and after blowing off any still remaining phenol is separated as a white crystalline sodium salt on cooling of the hot solution. In its free state it has the following formula:

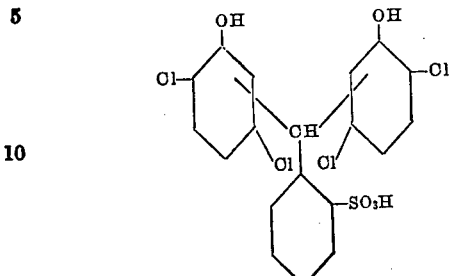

it being uncertain whether the aldehyde residue is attached to the benzene nuclei in ortho- or para-position to the hydroxy group. With ferric chloride the aqueous solution thereof becomes violet in color and after a short time separates an almost colorless iron salt. Calcium and aluminium salts form small sparingly soluble crystals.

Sulfuric acid of only 60° Bé. suffices for the condensation of the same aldehyde with m-chloro-phenol or 6-chloro-2-cresol. In the same manner as the chloro phenols above specified behave also, for example, 4-chloro-2-cresol ($CH_3$ : OH : Cl = 1 : 2 : 4), 2.5-dibromo-phenol and m-chloro guaiacols. Isomers of the aldehydes specified, chlorinated benzaldehydes or hydroxy or sulfonic acid derivatives thereof, and also naphthaldehydes and the like, behave in a like manner.

Acid condensing agents other than those specified may also be employed.

We claim:

1. The process which comprises causing an about molecular quantity of an aldehyde and about two molecular quantities of a phenol containing a halogen atom in m-position to the hydroxy group, being unsubstituted in the p-position to the hydroxy group, and which may be further substituted by halogen, alkyl or alkyloxy groups, to react upon each other in the presence of a condensing agent.

2. The process which comprises causing an about molecular quantity of an aldehyde and about two molecular quantities of a phenol containing a halogen atom in m-position to the hydroxy group, being unsubstituted in the p-position to the hydroxy group, and which may be further substituted by halogen, alkyl or alkyloxy groups, to react upon each other in the presence of a condensing agent at a temperature of about 15–100° C. and for a time ranging from three hours to three days.

3. The process which comprises causing an about molecular quantity of an aromatic aldehyde which may be substituted in the nucleus by sulfo-, halogen-, hydroxy- and halogen- or sulfo- and halogen groups and about two molecular quantities of a phenol containing a chlorine atom in m-position to the hydroxy group, being unsubstituted in the p-position to the hydroxy group, and which may be further substituted by halogen, alkyl or alkyloxy groups, to react upon each other in the presence of a condensing agent at a temperature of about 15–100° C. and for a time ranging from three hours to three days.

4. The process which comprises causing an about molecular quantity of sodium benzaldehyde-o-sulfonate and about two molecular quantities of 2.5-dichlorophenol to react upon each other in sulfuric acid of 66° Bé. for about 24 hours at about 50° C.

5. As new products the compounds of the probable general formula

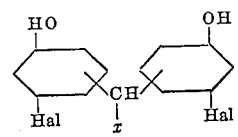

wherein Hal stands for halogen atoms, $x$ stands for hydrogen which may be substituted by alkyl or aryl, the

group being attached to the phenol nuclei in ortho or para-position to the hydroxy groups, in case it being attached in ortho position the para-position being unsubstituted and wherein the phenol nuclei may be further substituted by halogen, alkyl or alkyloxy groups, being generally colorless or nearly colorless powders which are insoluble in water, except those as contain a sulfo group, and being suitable for moth proofing materials liable to attack by moths.

6. As new products the compounds of the probable general formula

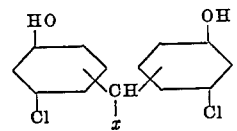

wherein $x$ stands for hydrogen which may be substituted by alkyl or aryl, the group

being attached to the phenol nuclei in ortho or para position to the hydroxy groups, in case it being attached in ortho position the para position being unsubstituted and wherein the phenol nuclei may be further substituted by halogen, alkyl or alkyloxy groups, being generally colorless or nearly colorless powders which are insoluble in water, except those as contain a sulfo group, and being suitable for moth proofing materials liable to attack by moths.

7. As new products the compounds of the probable general formula

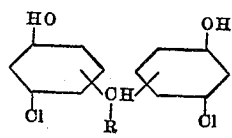

R stands for an aromatic nucleus which may be substituted, the group

being attached to the phenol nuclei in ortho or para position to the hydroxy groups, in case it being attached in ortho position the para position being unsubstituted and wherein the phenol nuclei may be further substituted by halogen, alkyl or alkyloxy groups, being generally colorless or nearly colorless powders which are insoluble in water, except those as contain a sulfo group, and being suitable for moth proofing materials liable to attack by moths.

8. As a new product the compound of the probable formula

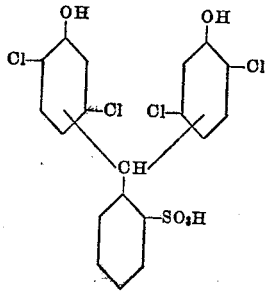

it being uncertain whether the aldehyde residue is attached to the phenol nuclei in ortho- or para-position to the hydroxy group, yielding in aqueous solution with ferric chloride a violet coloration and being suitable for moth proofing materials liable to attack by moths.

In testimony whereof, we affix our signature.

MAX WEILER.
KARL BERRES.
BERTHOLD WENK.
HERMANN STÖTTER.